(12) United States Patent
Schweikhardt et al.

(10) Patent No.: US 9,159,366 B2
(45) Date of Patent: Oct. 13, 2015

(54) DEVICE FOR PLAYBACK IN A MOTOR VEHICLE AND METHOD FOR SYNCHRONIZATION

(71) Applicant: Harman Becker Automotive Systems GmbH, Karlsbad (DE)

(72) Inventors: Markus Schweikhardt, Loffenau (DE); Ulrich Wenckebach, Karlsruhe (DE); Matthias Seidel, Pfinztal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 235 days.

(21) Appl. No.: 13/667,628

(22) Filed: Nov. 2, 2012

(65) Prior Publication Data

US 2013/0114653 A1    May 9, 2013

(30) Foreign Application Priority Data

Nov. 3, 2011    (EP) ..................... 11008785

(51) Int. Cl.
*G11B 27/10*   (2006.01)
*G11B 27/36*   (2006.01)
*H04N 21/414*  (2011.01)
*H04N 21/442*  (2011.01)
*H04N 21/443*  (2011.01)
*H04N 21/43*   (2011.01)
*H04N 21/4363* (2011.01)
*H04N 21/845*  (2011.01)

(52) U.S. Cl.
CPC ............... *G11B 27/10* (2013.01); *G11B 27/36* (2013.01); *H04N 21/41422* (2013.01); *H04N 21/4302* (2013.01); *H04N 21/43637* (2013.01); *H04N 21/4424* (2013.01); *H04N 21/4436* (2013.01); *H04N 21/8456* (2013.01)

(58) Field of Classification Search
CPC .. G11B 27/10; G11B 27/36; H04N 21/41422; H04N 21/4302; H04N 21/43637; H04N 21/4424; H04N 21/4436; H04N 21/8456
USPC .................. 375/219, 222; 700/88; 709/219
See application file for complete search history.

(56) References Cited

U.S. PATENT DOCUMENTS

2004/0242224 A1   12/2004   Janik et al.
2006/0194549 A1   8/2006    Janik et al.
(Continued)

FOREIGN PATENT DOCUMENTS

EP    2051157 A1    4/2009
GB    2403377 A     12/2004

OTHER PUBLICATIONS

European Search Report for corresponding European Application No. 11008785.5, mailed Mar. 28, 2012, 6 pages.

*Primary Examiner* — David B. Lugo
(74) *Attorney, Agent, or Firm* — Brooks Kushman P.C.

(57) ABSTRACT

A device and method for synchronization of data for audio and/or video between a memory of a device in a motor vehicle and an external device is provided. The method comprises synchronizing the data between the memory and the external device through a radio connection through a synchronization unit. The method further comprises outputting a status signal (St) based on a charge state (C) of the first power source by a monitoring unit to the synchronization unit and signaling from the synchronization unit to the external device an interruption of the synchronization due to low charge level. The method further comprises terminating the synchronization of the data based on the status signal (St) indicating that the charge state (C) of the first power source is below a threshold (th) and/or that a second power source for charging of the first power source is disconnected from the first power source.

19 Claims, 2 Drawing Sheets

(56) References Cited

U.S. PATENT DOCUMENTS

| | | | |
|---|---|---|---|
| 2007/0120829 A1* | 5/2007 | Ono | 345/169 |
| 2007/0288102 A1 | 12/2007 | Korzin | |
| 2008/0144601 A1* | 6/2008 | Nurminen et al. | 370/350 |
| 2010/0007006 A1* | 1/2010 | Job Doraisamy et al. | 257/691 |
| 2010/0332569 A1* | 12/2010 | Bryant-Rich et al. | 707/912 |

* cited by examiner

DEVICE FOR PLAYBACK IN A MOTOR VEHICLE AND METHOD FOR SYNCHRONIZATION

CROSS-REFERENCE TO RELATED APPLICATIONS

This application claims priority to EP Application No. 11008785.5-1247, entitled "Device for Playback in a Motor Vehicle and Method for Synchronization," filed on Nov. 3, 2011, the disclosure of which is hereby incorporated by reference in its entirety.

TECHNICAL FIELD

The present invention concerns a device for playback in a motor vehicle and a method for synchronization.

BACKGROUND

An audio interface box for vehicles that is located in the vehicle is disclosed in DE 10 2008 051 663 A1 ("the '663 application"). The audio interface box includes a Universal Serial Bus (USB) connection, by means of which it is connected to a vehicle modem through a USB bulk, a USB Media Transfer Protocol (MTP), a USB Communication Device Class (CDC), a Universal Asynchronous Receiver Transmitter (UART) serial, a Controller Area Network (CAN) bus or a Media Oriented System Transport (MOST) bus connection. In order to expand the bandwidth of the information and entertainment options available in the vehicle, the '663 application proposes that the vehicle modem be implemented as a Universal Mobile Telecommunications System (UMTS) modem or a High Speed Packet Access (HSDPA) modem and that a data processing and sorting unit be located between the UMTS or HSDPA modem on one hand and the audio interface box on the other hand, by means of which data received from the UMTS or HSDPA modem can be processed and sorted in such a manner that Internet radio programs can be received and played by means of the audio interface box.

US 2007/061725 A1 ("the '725 publication") depicts a system and method for managing content between different client devices in various domains (such as a vehicle, a home, and a person). The system and method include a user interface, a wireless transceiver, and a controller. The user interface is used to receive an input from a user to change the presentation of the content from a first client device to a second client device. The wireless transceiver is capable of wirelessly transmitting the input from the user through the communication system. The controller is responsive to the input from the user and used to determine a content format for the second device. The controller may also be used for determining whether the second device has a network capability for accessing the content format. Depending on the determinations made by the controller, the controller will transmit a data message to the second device to activate access to the content if the second device has the network capability for accessing the content format. On the other hand, the controller will obtain the content and transmit the obtained content to the second device if the second device does not have the network capability for accessing the content format.

An audio interface box for vehicles is disclosed in DE 10 2008 051 663 A1 (the '663 application). By means of a vehicle wireless local area network (WLAN) dongle or its WLAN antenna, the vehicle's approach to a WLAN network access point can be detected. The WLAN network is a network that is associated with the vehicle user, to which a server unit or a media server belongs. In the vicinity of the access point of the WLAN network associated with the vehicle user, the vehicle WLAN dongle can be synchronized automatically with the server unit or media server of the WLAN network associated with the vehicle user. Once the vehicle WLAN dongle is synchronized with the media server of the WLAN network, files that are stored in a memory of the media server can be transmitted by the server to the WLAN dongle or to its USB memory stick and received there by means of a connection between the access point or the WLAN network on the one hand and the WLAN antenna or vehicle WLAN dongle on the other hand. These files can be stored in the USB memory stick of the WLAN dongle and can be forwarded by the WLAN dongle to the audio interface box through the USB or MTP connection and the USB port. The vehicle WLAN dongle and the media server of the WLAN network associated with the vehicle user are prepared or set such that the synchronization between the vehicle WLAN dongle and the network media server. It is always initiated and carried out automatically when the vehicle, and with it the WLAN dongle, approaches the access point of the WLAN network associated with the vehicle user. After synchronization, a determination can be made by means of the vehicle WLAN dongle as to whether files are present in the memory of the media server that should be transferred from the memory to the audio interface box located in the vehicle. If this is determined by the vehicle WLAN dongle, then these files are transmitted from the memory to the USB memory stick of the WLAN dongle. As soon as it is determined by the vehicle WLAN dongle that the vehicle is leaving the area of the access point of the WLAN network associated with the vehicle user, the vehicle WLAN dongle automatically switches over to a mass storage mirror operation. In this mass storage mirror operation, data or files stored in the USB memory stick of the WLAN dongle are mirrored to or towards the audio interface box located in the vehicle. Thus, files prepared and assembled in the media server of the WLAN network associated with the vehicle user are automatically transferred from the memory of the media server to the audio interface box of the vehicle so that they are always available to the vehicle user. By means of the UMTS modem that is associated with the vehicle WLAN dongle, it is possible for Internet radio programs to be received through a UMTS connection that is established between the vehicle WLAN dongle and the WLAN network provided with the Internet access point when the vehicle approaches an Internet access point or hotspot equipped with a WLAN network. The vehicle WLAN dongle, which is also designed as a data processing and sorting unit, processes the received data so that the Internet radio programs are accessible and can be automatically stored in the USB memory stick of the vehicle WLAN dongle and/or played by means of the vehicle audio interface box.

SUMMARY

According to one aspect an improvement to synchronizing data is described through a method having the features of the independent claim 1. Various refinements are the subject matter of dependent claims and included in the description.

Accordingly, a method is provided for synchronization of data for audio and/or video between a memory of a device in a motor vehicle and an external device. The data for audio and/or video may be digital audio files, such as mp3 files and/or video files, such as MPEG files and/or image files, such as JPEG files and/or playlists or the like.

The method may comprise the step of synchronizing the data between the memory and the external device through a radio connection by means of a synchronization unit of the device.

The method may comprise the step of monitoring a first power source for powering the synchronization unit and memory by a monitoring unit. The monitoring may take place continuously, at least during the synchronization.

The method may comprise the step of outputting a status signal based on a charge state of the first power source by the monitoring unit to the synchronization unit.

The method may comprise the step of signaling from the synchronization unit to the external device, an interruption of the synchronization due to low charge level, where information is transmitted to the external device before the termination of the synchronization of data. The interruption may occur for an extended period of time.

The method may comprise the step of storing information at the external device to continue the synchronization when a connection is restored at a later time.

The method may comprise the step of terminating the synchronization of the data based on the status signal. the status signal may indicate that the charge state of the first power source is below a threshold and/or that a second power source for charging of the first power source is disconnected from the first power source.

According to an additional aspect, a device for playback in a motor vehicle is improved with the features of the independent claim 10. Various refinements are the subject matter of dependent claims and included in the description.

Accordingly, a device is provided for playback of audio data and/or video data and/or image data in a motor vehicle. The device may be referred to as a head unit. The device may have components of an infotainment system in a motor vehicle.

The device may have a memory for storing data. The memory may be an installed semiconductor memory, a memory card, or a hard disk. The device may have a playback unit for outputting the data as an audio signal and/or video signal.

The device may have a synchronization unit. The synchronization unit may be connected to the memory for synchronization of the data. The synchronization unit may be designed to be configurable by user input.

The device may have a monitoring unit for monitoring a first power source. The first power source may be connected to the device to power at least the synchronization unit and the memory.

The synchronization unit may have a transmitter/receiver unit for a radio connection with an external device for synchronization of the data. The transmitter/receiver unit may be configured for the WLAN protocol. The external device may be a single device such as a personal computer, or the external device may be a media server networked with other devices, such as a multimedia player.

The monitoring unit may be configured to output a status signal to the synchronization unit. The output of the status signal may be based on the charge state of the first power source.

The synchronization unit may be configured to signal to the external device, an interruption of the synchronization due to a low charge level. The interruption may occur for an extended period of time. The synchronization unit may be configured to transmit the information to the external device before the termination of the synchronization of data.

The synchronization unit may be configured to continue the synchronization based on the information being stored at the external device when a connection is restored at a later time.

The synchronization unit may be configured to terminate synchronization of the data based on the status signal. For example, this condition may arise when the status signal indicates that the charge state of the first power source is below a threshold and/or that a second power source for charging of the first power source is disconnected from the first power source.

The status signal may be generated at that moment when the charge state falls below the threshold. The second power source may be a generator (or alternator) of the motor vehicle or a power grid (or national grid) for supplying power, such as a 400V three-phase grid. The second power source may be disconnected by an electrical switch from the first power source to avoid reverse current when no charging of the first power source can take place.

Many advantages are achieved by implementing the features as shown in FIGS. 1 and 2 by way of example. The synchronization may take place completely automatically for the user, without the user having to let an engine of the vehicle run in order to prevent the rechargeable battery of the vehicle from being drained. The synchronization allows an automated convenience function, with manual intervention on the part of the user being unnecessary.

The refinements described below relate to the device for playback as well as to the method for synchronization.

According to one embodiment, the method may comprise the step of restoring the connection and continuing the synchronization of the data based on the status signal, where the status signal indicates that the charge state of the first power source is above the threshold and/or that the second power source for charging of the first power source is connected to the first power source. The continuation may be based on the information stored at the external device.

According to one embodiment, the method may comprise the step of analyzing the information. The information may comprise a number of file names of video and/or audio files present in the memory of the device. The number of file names may be one file name that is the starting point for continuing synchronization. The number of file names may be sorted in a table, e.g. a Look-Up-Table (LUT) to be analyzed at the external device.

According to one embodiment, the method may comprise the step of dividing the data for synchronization into multiple segments. Each segment may comprise a number of video/audio files. According to one embodiment the method may comprise the step of prioritizing the segments. Three different priority levels may be used. According to one embodiment the method may comprise the step of synchronizing the segments with highest priority first.

According to one embodiment, the method may comprise the step of dividing the data for synchronization into multiple segments. Each segment may comprise a number of video/audio files. According to one embodiment the method may comprise the step of prioritizing the segments. According to one embodiment, the method may comprise the step of synchronizing only metadata of the segments with lowest priority.

According to one embodiment, the method may comprise the step of dividing the data for synchronization into multiple segments. Each segment may comprise a number of video/audio files. According to one embodiment, the sequence of at least two segments for synchronization may be specifiable by a user input.

According to one embodiment, the method may comprise the step of starting a standby mode for synchronization after ascertaining a powering off by a user.

According to one embodiment, the method may comprise the steps of activating the synchronization unit, the memory, the monitoring unit and deactivating at least one additional unit.

According to one embodiment, the method may comprise the steps of starting program sequences for synchronization and stopping at least one additional program sequence for replaying audio or video.

According to one embodiment, the synchronization may take place based on a predefined setting by the user. For example, first the data that is not present on the external device is transmitted to the external device from the memory of the device of the motor vehicle.

According to one embodiment, the monitoring unit may be configured to ascertain the charge state based on at least one measured quantity, wherein an input of the monitoring unit can be connected to the first power source. According to one embodiment, the monitoring unit may be connected to a power management unit of the motor vehicle. The monitoring unit may be connected with the power management unit through a data bus (CAN, MOST) of the motor vehicle. The charge state may be transmitted by the power management unit to the monitoring unit. The monitoring unit may be configured to generate and output the status signal based on the transmitted charge state.

According to one embodiment, the monitoring unit may have a measurement input that is connectable to the first power source for measuring a parameter of the first power source. The parameter of the first power source may be a voltage, a current, or a time behavior (integral) thereof. The monitoring unit may be designed to ascertain the charge state and the status signal based on the parameter.

According to one embodiment, the monitoring unit may have an input for connection with an energy management unit of the motor vehicle. The energy management unit may serve to control the power distribution in the motor vehicle. The monitoring unit may be designed to generate the status signal based on a communication with the energy management unit.

According to one embodiment, the device may be configured to activate the synchronization unit, the memory and the monitoring unit and to deactivate at least one additional unit of the device for synchronization. The power consumption of the device is significantly reduced by the deactivation of the additional unit.

According to one embodiment, the device may be configured to start program sequences for synchronization and to stop at least one additional program sequence for replaying audio or video for the synchronization. Again, power consumption of the device is significantly reduced.

According to one embodiment, an item of information associated with the termination of the synchronization of the data may be transmitted to the external device. This may signal to the external device that the synchronization is being interrupted for an extended period of time. Data for synchronization may be stored so that the synchronization can be continued when a connection is restored at a later time.

According to one embodiment, the data for synchronization may be divided into multiple segments. For example, subdivision into storage sizes is carried out, which are adapted to, for example, the anticipated transmission rate. The storage size is, for example, two gigabytes.

According to one embodiment, the segments may be prioritized. The prioritization may be carried out automatically by the device and/or by the external device. The prioritization may be accomplished by means of a learning algorithm concerning the behavior of the user. The audio files listened to most frequently or most recently may be accorded the highest priority.

According to one embodiment, the segments with highest priority may be synchronized first. This achieves the advantage that the data that are presumably most important for the user, are present in the memory of the device for the next trip and do not have to be downloaded or streamed.

According to one embodiment, the data for synchronization may be divided into multiple segments. The sequence of at least two segments for synchronization may be specified by a user input.

The embodiments described above are especially advantageous, both individually and in combination. All embodiments may be combined with one another. Some possible combinations are explained in the description of the exemplary embodiments from the figures. However, these possibilities of combinations of the embodiments as introduced are not exhaustive.

BRIEF DESCRIPTION OF THE DRAWINGS

The invention as set forth in detail below are explained through exemplary embodiments and with reference to drawings.

DETAILED DESCRIPTION

A hard disk in a car's head unit (HU) may be used, if the user would like to have his media (music, pictures, movies) collection available in his car. The user would bring his compact disc (CD) collection into his car and the head unit can rip them while the data is played back or while listening to the radio. Today, the user wants his/her video/music collection to be stored in the head unit without any noteworthy effort. Additionally, modern head units are configured to store audio/video data that the user buys while on the road.

For example, high definition (HD) radio stations can transmit an article identification number in their digital data stream. This can be used to present a customer the option of buying a song/video and downloading it from the provider while it plays. Or, the head unit can identify a song via, for example, Gracenote and present the user with the option of buying the song/video from a list of shops. The user would like to have the songs that he/she has bought while on the road to be available on other devices that he/she uses as well and vice versa.

Figure 1:
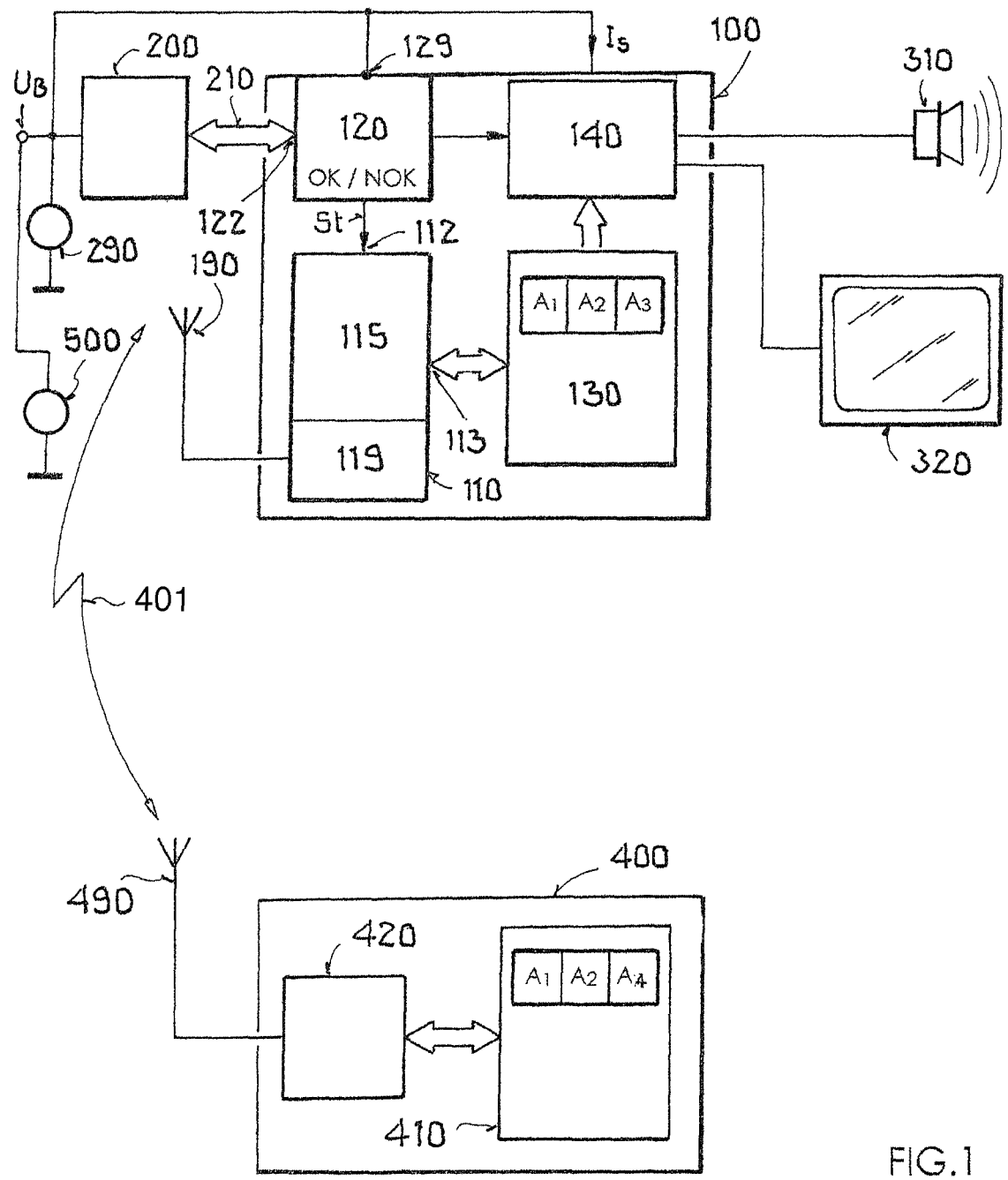
FIG. 1 a schematic block diagram.

As shown in FIG. 1, a block diagram with a device 100 (also called head unit) for playback of data $A_1, A_2, A_3$ as audio and/or video signal in a motor vehicle is provided. The device 100 may be connected to a loudspeaker 310 for audio playback and to a display 320 for video playback. The device 100 may have storage (or memory) 130 for storing data $A_1, A_2, A_3$. The storage 130 is connectable to an interface 113 of a synchronization unit 110. The synchronization unit 110 is configured to synchronize the data $A_1, A_2, A_3$ in the storage 130 with an external device 400. For purposes of synchronization, the synchronization unit 110 may have a transmitter/receiver unit 119 for a radio connection 401 with the external device 400.

The device 100 may be equipped with a short range high speed wireless network interface 119, e.g. WLAN. The device may be configured to become a member of a media network the user already uses, whereas the external device 400 may be a current member of the media network. The external device 400 may be a home media server or a media server located in a cloud.

When the car has access to the home network, e.g., while standing in the user's garage, the synchronization 110 unit can synchronize with the external device 400 in the home network. The synchronization may start automatically if the connection has been established. The automatic start may be initialized, if there is a synchronization flag set by the user. The start may also be initialized, if the data $A_1, A_2, A_4$ at the server 400 has been changed before connecting (e.g., if a new video file has been added). The start may also be initialized, if the data $A_1, A_2, A_3$ stored in the memory 130 has been changed before connecting (e.g., if a new audio file has been added).

To start with, the radio connection 401 may be established through an antenna 190 connected to the transmitter/receiver unit 119 and through an antenna 490 connected to the external device 400. The antenna 490 may be connected to a WLAN transceiver 420. The WLAN transceiver 420, in turn, may be connected to a network storage 410. The external device 400 may have or may be connected to the at least one storage 410 with external data $A_1, A_2, A_4$ to be synchronized. The synchronization unit 110 may have a computing unit 115 for carrying out the synchronization. The computing unit 115 of the synchronization unit 110 may be designed for especially low power consumption so that a main processor (not shown) of the device 100 is not required for synchronization or may be operated in a mode with low power consumption.

According to one embodiment, a UMTS or long term evolution (LTE) modem may be used to access the media network while on the go whenever spare bandwidth is available. On the hardware side, the device 100 may be equipped with the wireless interface 119 that the device 100 can sustain over a long period of time without consuming too much power while synchronizing. The device 100 and hence the synchronization unit 110 and the storage 130 may be supplied with a supply current, $I_s$ by a first power source 290. The first power source 290 may have a charge state. The first power source 290 may be implemented as a rechargeable battery. The first power source 290 may be charged and discharged.

If the first power source 290 is charged, synchronization may be in progress in a normal mode, hence no low power consumption may be required in normal mode. In the normal mode, synchronization may be done with lower priority than other routines, like the playback routine.

The device 100 may have a monitoring unit 120 for monitoring the charge state of the first power source 290 during synchronization in a synchronization mode. If the first power source 290 is discharged during synchronization, low power consumption may be required. Low power consumption may be achieved by the (special) synchronization mode that may be referred to as standby mode. During synchronization in the synchronization mode, the device 100 may turn off most of its power consumers such as tuners, amplifiers, accelerator chips etc. In one embodiment, one of the power consumers is a playback unit 140 for output of the data A1, A2, A3 as an audio signal and/or video signal, which is turned off during this standby mode. The device 100 may be brought back into operation when turned on while in this standby mode. In contrast, the monitoring unit 120 is active in this standby mode. The monitoring unit 120 may be designed to output a status signal, St based on the charge state of the first power source 290 to the synchronization unit 110.

During synchronization in synchronization mode, the synchronization unit 120 may closely monitor the charge state of the first power source 290. In one embodiment, two possibilities for monitoring are shown schematically. The monitoring unit 120 may have a measurement input 129, which is connectable to the first power source 290. The measurement input 129 makes it possible, for example, to measure the cell voltage $U_B$ of the rechargeable battery 290. Using the cell voltage $U_B$, or its behavior, the charge state of the rechargeable battery 290 may be ascertained by the monitoring unit 120. The cell voltage $U_B$, and hence the charge state, may be compared with a threshold (th) and the values OK or NOK may be output to the input 112 of the synchronization unit 110 as status signal St. If the charge state is too low before synchronization, the synchronization mode and the synchronization may not even be started.

Oftentimes, central power management systems are provided in motor vehicles. Such central power management systems control the power consumption of individual power consumers in the vehicle in order to avoid excessive discharging of the battery 290. In one embodiment, an interface 122 of the monitoring unit 120 is connectable through a bus 210 to a central energy management unit 200. Budgeting of the power consumption by the power consumers in the motor vehicle may be carried out by the central energy management unit 200. If the charge state of the first power source 290 drops below a threshold (th), no budget for synchronization can be available to the synchronization unit 110, and the central energy management unit 200 may transmit appropriate information through the bus 210 to the monitoring unit 120. From this information, the monitoring unit 120 may generate value NOK of the status signal St. The status signal St may be output to the control input 112 of the synchronization unit 110.

The synchronization unit 110 may be configured to terminate synchronization of the data $A_1, A_2, A_3$ based on the status signal St when the status signal St indicates that the charge state of the first power source 290 is below a threshold th and/or that a second power source 500 for charging the first power source 290 is disconnected from the first power source 290. A power allocation algorithm may be used to assure that power consumption limitations are not exceeded. After termination of the synchronization, the device 100 may be shut down and may be operated in an operating state with minimal power consumption.

The second power source 500 may be a generator (alternator) of the motor vehicle, or a power grid for charging an electric vehicle, or solar cells or the like. If the second power source 500 is a generator (alternator) of the motor vehicle, then charge remaining in the rechargeable battery 290 must reliably be sufficient to start the vehicle. In contrast, if the motor vehicle is an electric car, the charge of the rechargeable battery 290 may not be used for synchronization, so that synchronization only may take place when the power grid (e.g., a 400V three-phase grid), as the second power source 500 for charging the rechargeable battery 290 is connected. When the rechargeable battery 290 is being charged by the second power source 500, the synchronization can take place at the same time.

If a home network is available, the device 100 of the car may inform the external device 400 of the local network about the reason for power down before interrupting communication. The synchronization unit 110 may be configured to signal to the external device 400 an interruption of the synchronization due to low charge level. The interruption may last until the engine of the vehicle is turned on, or until the first power source 290 is connected to a power grid. The synchronization unit 110 may be configured to transmit the information to the external device 400 before the termination. An item of information associated with the termination of the synchronization of the data may be transmitted to the external device 400. This may signal to the external device 400 that the synchronization is being interrupted for an extended period of time. Data for synchronization may be stored so that the synchronization can be continued when a connection is restored at a later time.

The synchronization unit 110 may be configured to continue the synchronization based on the information being stored at the external device 400 when a connection is restored at a later time. In one embodiment the information stored at the external device 400 may be used to generate a data header to transmit a continuation signal from the external device 400 to the synchronization unit 110. The synchronization allows an automated convenience function, with manual intervention on the part of the user being unnecessary.

Even during synchronization, the device 100 does not need to fully power up, only the synchronization unit 110 and the storage 130 are supplied. All other units may stay disconnected from supply so that discharging the first power source 290 is minimized.

The synchronization unit 110 may be equipped for automatically restarting the synchronization when the first power source 290 is recharged and the connection to the external device 400 is restored. For example, the synchronization unit 110 may get the value OK of the status signal St and may initialize the connection 410 to the external device 400. After establishing the connection 410 again, the external device 400 and the synchronization unit 110 may continue the synchronization at the same state it has been stopped due to the low charge state.

Figure 2:
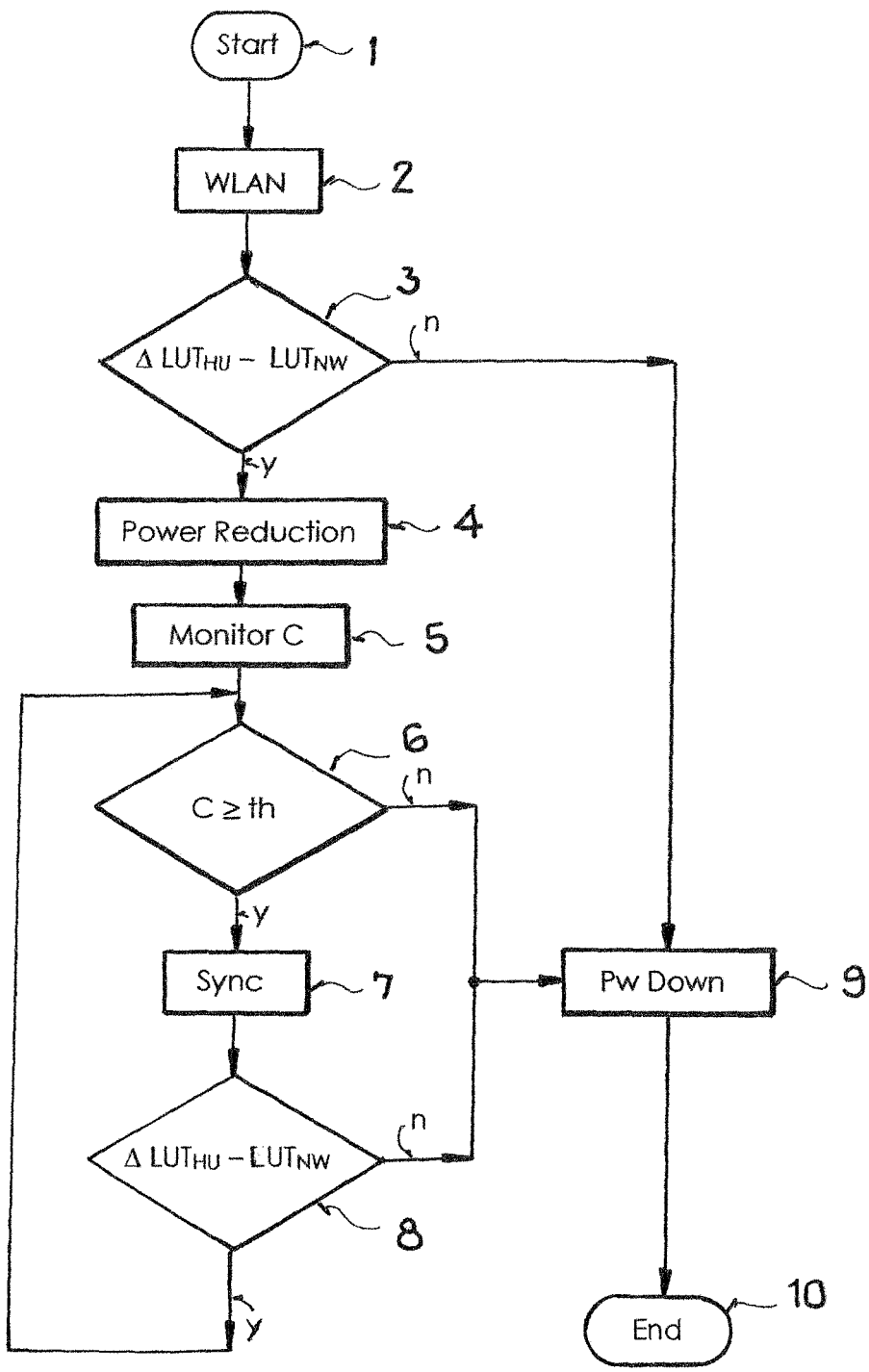
FIG. 2 a schematic flow diagram.

FIG. 2 schematically shows a process sequence as a flowchart. In a first step 1, the program may be started with the device 100 being started up in order to output audio and/or video signals during the trip. In a second step 2, the vehicle may arrive within range for a radio connection 401, for example within range of a WLAN access point that permits a fast data connection for synchronization of video data and audio data.

In a third step 3, a data difference Δ may be ascertained in that a lookup table $LUT_{HU}$ of the device 100 is compared with a lookup table $LUT_{NW}$ of the external device 400. If a data difference Δ is present, the fourth step 4 may follow, otherwise a ninth step 9 may follow. The device 100 (head unit) and the external device 400 connected via WLAN may be configured to input the settings of the synchronizing from any controlling device controlled by the user. The controlling device may be a smart phone, the head unit 100, or a desktop PC for comfort.

Referring back to FIG. 1, an example is shown in which the audio data A1, A2 and A3 may be stored in the memory 130 of the device 100. In contrast, the audio file A3 may not be present in the external device 400. Furthermore, the external device 400 additionally may have the audio file A4. The user can define through the settings whether the data in the memory 130 of the device 100 or the data in the external device 400 will be completed first. Authentication may often be required for this process, but the details of this are not shown in FIG. 2.

Different operation modes for synchronizing are possible.

1) The device (or head unit (HU)) 100 may synchronize the entire storage 410 of the media server 400 being the external device or a defined "range" of. In this mode, it is likely that the device 100 cannot store in the storage 130 all the content of the storage 410 of the media server 400, either because of limited disc space or because the synchronization could not complete. The synchronization unit 110 of device 100 may then synchronize a "viewport" of the media server 400 storage 410. The device 100 may adjust the viewport of the media server 400, even without the media server 400 content $A_1$, $A_2$, $A_4$ changing, based on user behavior. For example, the device 100 may learn which songs the user prefers to hear (e.g. currently in contrast to long time statistics or in the car in contrast to at home or in winter in contrast to in summer, or the like.)

Also, the device 100 would ideally hide the fact that only a viewport of the media server 400 is available. For example, a user searches for a song or other media he would like to consume. The device 100 would first search the local viewport, then the media server 400 followed by a set of commercial music databases, presenting the resulting options as they become available (play now, get from media server 400, buy from shop). When songs need to be downloaded from either a media server 400 or a shop, inside a vehicle depending on network and bandwidth availability different playback methods may be necessary (streaming with different buffer lengths vs. download).

2) The device 100 does not automatically synchronize a "range" from the media server 400, but only synchronizes one or more lists of one or more single items (e.g., playlists of songs, a photo album or one movie that have explicitly been selected for synchronizing by the user.)

In a fourth step 4, the device 400 may be operated in a synchronization mode prior to the synchronization, in that the power consumption is reduced in comparison with a playback mode for playback of audio and/or video signals. To this end, all components of the device 100 that are not needed for synchronization and monitoring may be deactivated. In one embodiment, the playback unit 140 and hence also the loudspeaker output through the loudspeaker 310 and the display 320 may be deactivated in the synchronization mode.

In a fifth step 5, a charge status C may be monitored by the monitoring unit 120. As explained for FIG. 1, this can be accomplished by means of the measurement input 129 or through the connection 210 through input 122 of the monitoring unit 120. In a sixth step 6, the charge status C may be compared with a threshold th. If the charge status C exceeds the threshold th, then in step 7, a first part of the synchronization may be carried out. In an eighth step 8, a determination is made as to whether additional parts are on hand for synchronization, so that the steps 6 and 7 are repeated if necessary. If the synchronization has been interrupted due to low charge state, the synchronization will be continued in step 7 seamlessly. Therefore, downloaded data is not downloaded again. No new re-estimation of the tables $LUT_{HU}$ or $LUT_{NW}$ is necessary.

If the charge state C in the sixth step 6 is lower than the threshold th, or if the synchronization has already been completely finished in the eighth step 8, then the ninth step 9 follows. In the ninth step 9, the device 100 may be powered down completely with the exception of components for a renewed start of the device 100. The synchronization unit 110, the memory 130, and if applicable the monitoring unit 120 may be deactivated, and programs are terminated in the tenth step 10.

The invention is not restricted to the embodiments shown in FIGS. 1 and 2. For example, it is possible to use a different radio connection 401 as an alternative to WLAN, such as ZigBee® or LowPower-Bluetooth®, which have a lower power demand. If the vehicle is an electric car, the synchronization may only be started if the second power source is connected. The functionality of the device 100 shown in FIG.

1 can be used to especially good advantage for an infotainment system of a motor vehicle.

LIST OF REFERENCE CHARACTERS 100 device, head unit
110 synchronization unit
112 control input
113 interface
115 computing unit
119 transmitter/receiver unit
120 monitoring unit
122 input, interface
129 measurement input
130 memory, storage
140 playback unit
190 antenna
200 power management unit
210 bus connection
290 first power source, rechargeable battery
310 loudspeaker
320 display, screen
400 external device
420 WLAN router, personal computer
410 memory, storage
409 antenna
500 second power source
A1, A2, A3, A4 audio file
C charge state
$LUT_{HU}$, $LUT_{NW}$ lookup table
OK/NOK control value
St control signal
Th threshold
$U_B$ rechargeable battery voltage

What is claimed is:

1. A method for synchronization of data for audio and/or video between a memory of a device in a motor vehicle and an external device, the method comprising the steps:
   monitoring a first power source for powering a synchronization unit and the memory by a monitoring unit; and
   if a charge state (C) of the monitored first power source is above a threshold, starting a synchronization mode and performing in that mode the steps of:
      starting program sequences for synchronization and stopping at least one additional program sequence for replaying audio or video;
      synchronizing the data between the memory and the external device through a radio connection by means of the synchronization unit of the device;
      monitoring the first power source for powering the synchronization unit and the memory by the monitoring unit;
      outputting a status signal (St) based the charge state (C) of the first power source by the monitoring unit to the synchronization unit;
      signaling from the synchronization unit to the external device, an interruption of the synchronization due to a low charge level, wherein information is transmitted to the external device before a termination of the synchronization of the data;
      storing information at the external device to continue the synchronization when a connection is restored at a later time;
      terminating the synchronization of the data based on the status signal (St), the status signal (St) indicating that the charge state (C) of the first power source is below the threshold and/or that a second power source for charging of the first power source is disconnected from the first power source; and
      synchronizing a viewport of storage of the external device only in the case of an interruption of the synchronization of the data.

2. The method according to claim 1 further comprising the step of:
   restoring the radio connection and continuing the synchronization of the data based on the status signal (St), the status signal (St) indicating that the charge state (C) of the first power source is above the threshold and/or that the second power source for charging of the first power source is connected to the first power source, wherein the continuation is based on the information stored at the external device.

3. The method according to claim 1 further comprising the step of:
   analyzing the information, the information comprising a number of file names of video and/or audio files present in the memory of the device.

4. The method according to claim 1 further comprising the steps of:
   dividing the data for synchronization into multiple segments;
   prioritizing the segments; and
   synchronizing the segments with a highest priority first.

5. The method according to claim 1 further comprising the steps of:
   dividing the data for synchronization into multiple segments;
   prioritizing the segments; and
   synchronizing only metadata of the segments with lowest priority.

6. The method according to claim 1 further comprising the step of:
   dividing the data for synchronization into multiple segments, wherein the sequence of at least two segments for synchronization is specified by a user input.

7. The method according to claim 1 further comprising the step of:
   starting a standby mode for synchronization after ascertaining a powering off by a user.

8. The method according to claim 1 further comprising the step of:
   activating the synchronization unit, the memory, and the monitoring unit and deactivating at least one additional unit.

9. A device for playback in a motor vehicle, the device comprising:
   memory for storing data;
   a playback unit for output of the data as an audio signal and/or video signal;
   a synchronization unit connected to the memory for synchronization of the data; and
   a monitoring unit to monitor a first power source for powering the synchronization unit and the memory such that a synchronization mode is started in response to a charge state (C) of the monitored first power source being greater than a threshold;
   wherein the synchronization unit is configured to start program sequences for synchronization and to stop at least one additional program sequence for replaying audio or video in the synchronization mode;
   wherein the synchronization unit has a transmitter/receiver unit for a radio connection with an external device for the synchronization of the data in the synchronization mode;

wherein the monitoring unit is configured to output a status signal (St) based on a charge state of the first power source to the synchronization unit in the synchronization mode;

wherein the synchronization unit is configured to signal to the external device an interruption of the synchronization due to a low charge level in the synchronization mode, wherein the synchronization unit is configured to transmit information to the external device before a termination of the synchronization of data in the synchronization mode;

wherein the synchronization unit is configured to continue the synchronization based on the information being stored at the external device when a connection is restored at a later time in the synchronization mode;

wherein the synchronization unit is configured to terminate the synchronization of the data based on a status signal (St) indicating that the charge state of the first power source is below a threshold (th) and/or that a second power source for charging of the first power source is disconnected from the first power source in the synchronization mode; and wherein the synchronization unit is configured to communicate with the external device including storage and having a viewport that is synchronized only in the case of an interruption of the synchronization at the device.

10. A device according to claim 9 wherein the monitoring unit has a measurement input connected to the first power source for measuring a parameter (UB) of the first power source and is configured to determine the status signal (St) based on the parameter (UB).

11. A device according to claim 9 wherein the monitoring unit has an input for connection with an energy management unit of the motor vehicle to control power distribution in the motor vehicle, and the monitoring unit is configured to generate the status signal (St) based on a communication with the energy management unit.

12. A method for synchronization of data for at least one of audio and video between a device in a motor vehicle and an external device, the method comprising:
 monitoring a first power source for powering a synchronization unit and memory by a monitoring unit; and
 if a charge state (C) of the monitored first power source is above a threshold, starting a synchronization mode and performing in that mode the steps of:
  starting program sequences for synchronization and stopping at least one additional program sequence for replaying audio or video;
  synchronizing the data between memory and the external device through a radio connection via a synchronization unit of the device;
  monitoring a first power source that provides power to the synchronization unit and the memory;
  transmitting a status signal (St) based on the charge state of the first power source to the synchronization unit;
  transmitting from the synchronization unit to the external device, an interruption of the synchronization due to a low charge level, wherein information is transmitted to the external device prior to a an occurrence of terminating the synchronization of data;
  terminating the synchronization of the data in response to at least one of the status signal (St) indicating that the charge state of the first power source is below the threshold and a second power source for charging the first power source is disconnected from the first power source; and
  restoring the synchronization of the data when a connection is established at a later time; and
  synchronizing a viewport of a storage of the external device only in the case of an interruption of the synchronization of the data.

13. The method according to claim 12 further comprising restoring the radio connection and continuing the synchronization of the data based on the status signal (St), the status signal (St) indicating that the charge state (C) of the first power source is above the threshold and/or that the second power source for charging of the first power source is connected to the first power source, wherein the continuation is based on the information stored at the external device.

14. The method according to claim 12 further comprising analyzing the information, the information comprising a number of file names of video and/or audio files present in the memory of the device.

15. The method according to claim 12 further comprising:
 dividing the data for synchronization into multiple segments;
 prioritizing the segments; and
 synchronizing the segments with a highest priority first.

16. The method according to claim 12 further comprising:
 dividing the data for synchronization into multiple segments;
 prioritizing the segments; and
 synchronizing only metadata of the segments with lowest priority.

17. The method according to claim 12 further comprising dividing the data for synchronization into multiple segments, wherein the sequence of at least two segments for synchronization is specified by a user input.

18. The method according to claim 12 further comprising starting a standby mode for synchronization after ascertaining a powering off by a user.

19. The method according to claim 12 further comprising activating the synchronization unit, the memory, and a monitoring unit and deactivating at least one additional unit.

* * * * *